Sept. 29, 1959    R. A. MONTGOMERY    2,906,119
DAMPING-IN-PITCH BALANCE FOR WIND TUNNEL MODELS
Filed June 4, 1957    3 Sheets-Sheet 1
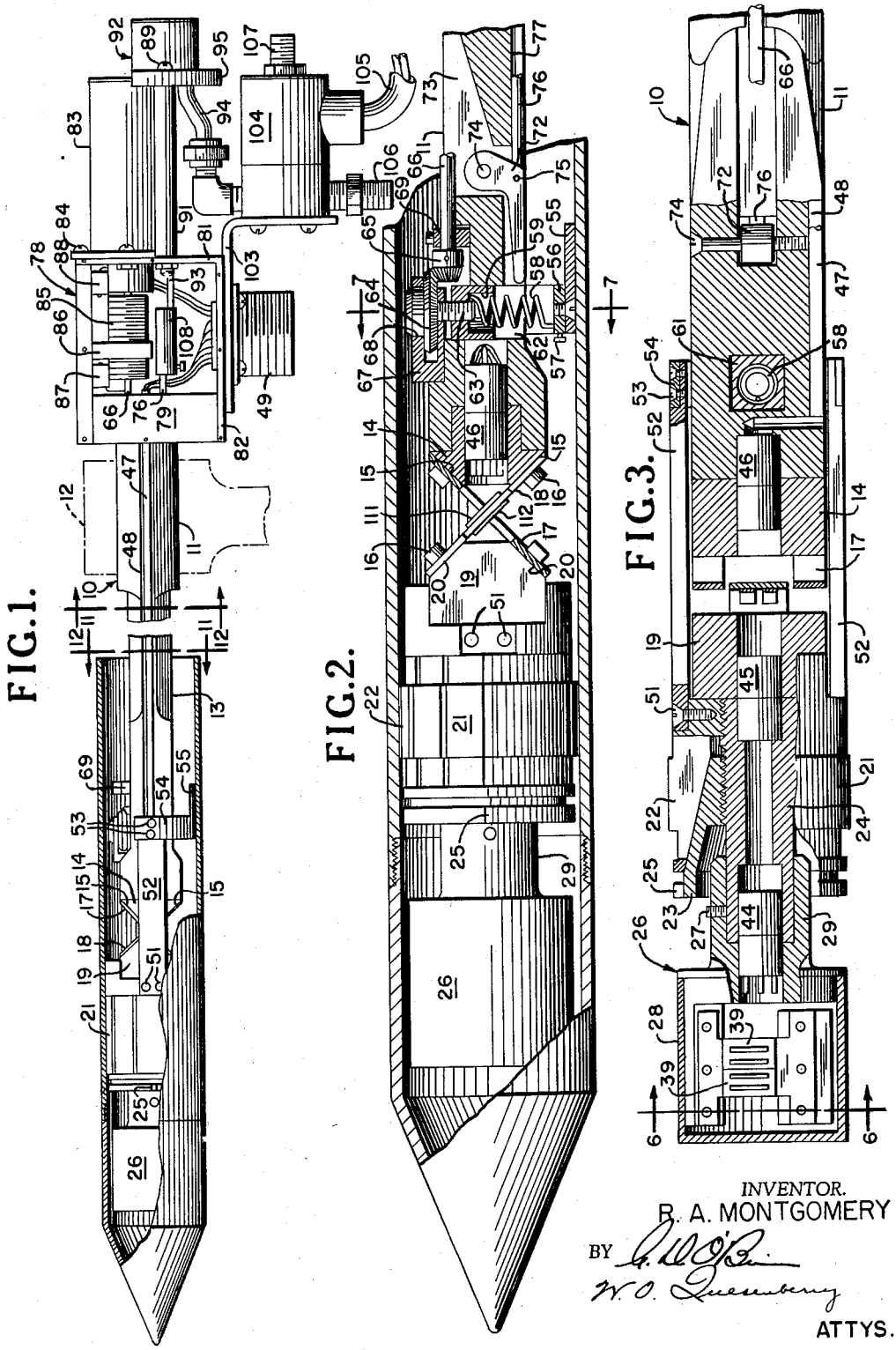
INVENTOR.
R. A. MONTGOMERY
ATTYS.

Sept. 29, 1959 R. A. MONTGOMERY 2,906,119
DAMPING-IN-PITCH BALANCE FOR WIND TUNNEL MODELS
Filed June 4, 1957 3 Sheets-Sheet 2
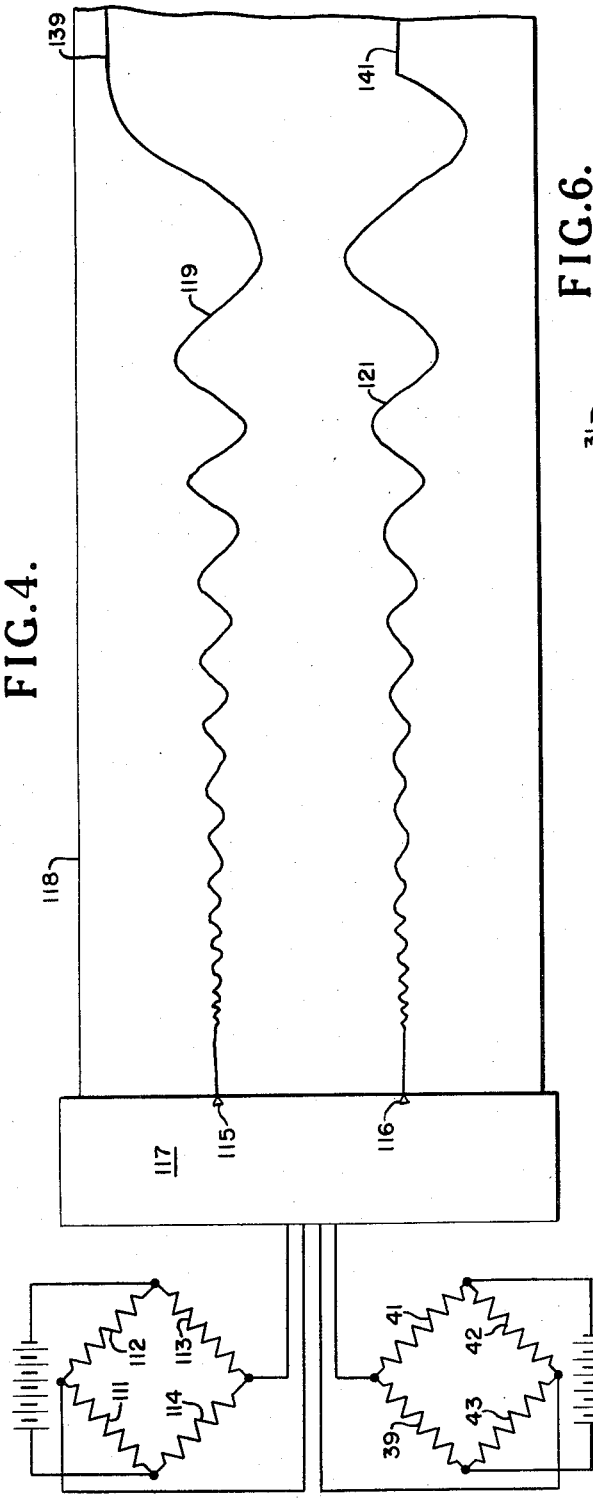
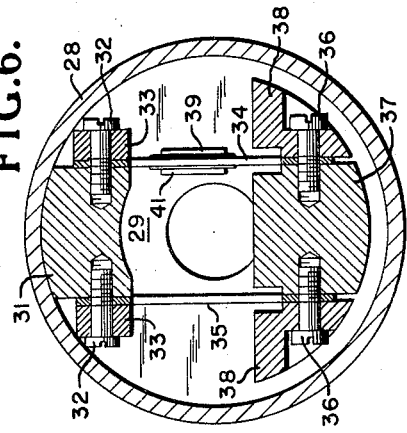
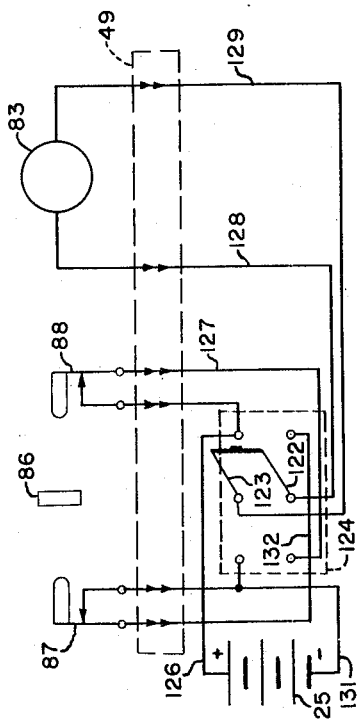
INVENTOR.
R. A. MONTGOMERY
BY
ATTYS.

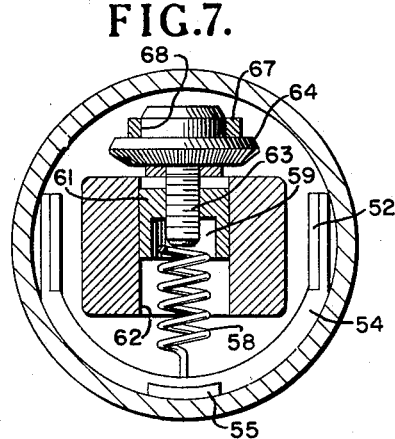
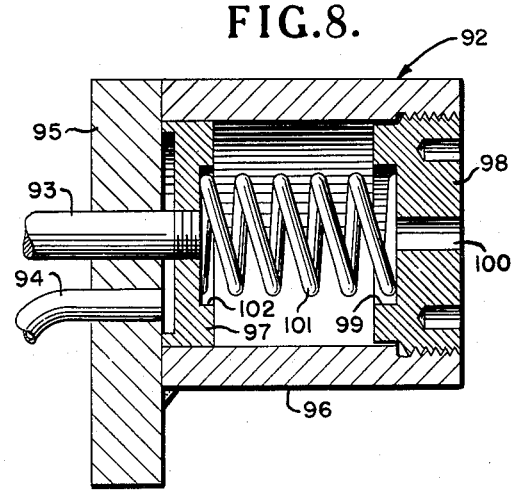
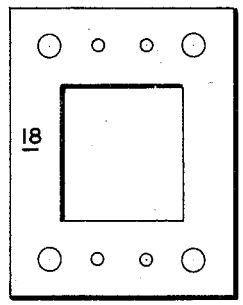
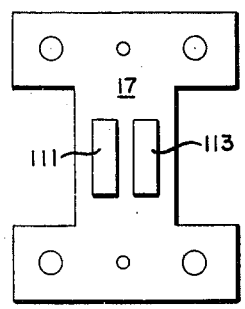
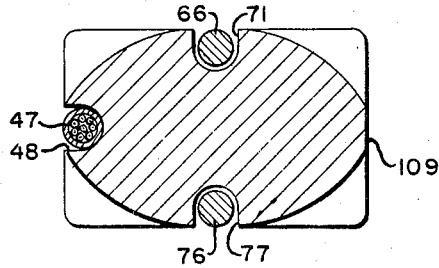
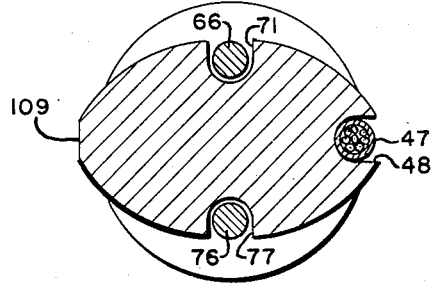

United States Patent Office 2,906,119
Patented Sept. 29, 1959

2,906,119

DAMPING-IN-PITCH BALANCE FOR WIND TUNNEL MODELS

Rayner A. Montgomery, Kensington, Md., assignor to the United States of America as represented by the Secretary of the Navy Application June 4, 1957, Serial No. 663,561

10 Claims. (Cl. 73—147)

(Granted under Title 35, U.S. Code (1952), sec. 266)

The invention described herein may be manufactured and used by or for the Government of the United States of America for governmental purposes without the payment of any royalties thereon or therefor.

This invention relates to an aerodynamic balance and more particularly to a balance for supporting an aerodynamic model within a wind tunnel of the supersonic type in which the model is caused to oscillate about a horizontal axis at its center of gravity and perpendicular to its longitudinal axis and which provides means for measuring continuously the angle of oscillation and the angular acceleration of the model while the wind tunnel is in operation.

The general purpose of this invention is to provide a balance for a small model of a weapon such, for example, as a projectile, rocket or the like in which the model may oscillate about a discrete point at various angles of attack in a high velocity stream of air while the model is disposed within a supersonic or hypersonic wind tunnel whereby the damping in the pitch balance of the model and the rate of such damping may be made manifest.

In devices of this type heretofore devised it has been the usual practice to support the model by a cantilever strain gage structure employing heavy coil springs for supplying a restoring moment at the angles of attack. Such devices have not proved altogether satisfactory in service for the reason that the point of rotation moved as a function of the spring force, the frequency of oscillation was fixed by the size of the spring required to obtain the restoring force, the strong spring employed caused a reaction in the sting supporting the model and the center of gravity and movement of the model was limited by reason of the structure employed to support it. The present device possesses all of the advantages of the foregoing device and none of the foregoing disadvantages.

In accordance with the present invention the model is supported by a flexible unit of steel crossed flexures within the damping balance which effectively permits the model to oscillate about a point. The amplitude of such oscillations, the pitch of the model corresponding thereto, is sensed by a plurality of strain gages secured to the flexure member and the angular acceleration of the decay in the angular movement of the model is sensed by an accelerometer carried in the forward end of the movable portion of the sting and within the model. The invention also contemplates the provision of means controlled from a distance for aligning the model with the axis of the sting yieldably while the model is disposed within the wind tunnel and prior to the beginning of the operational tests thereof. The device of the present invention also includes means for setting the model into oscillation while the tunnel is blowing at a selected Mach number, the means for setting the model into oscillation being controlled at a distance by an operator.

One of the objects of the present invention is the provision of a new and improved damping balance for an aerodynamic model in which the model is set into oscillation by remote control while the tunnel is blowing.

Another of the objects is the provision of means for yieldably aligning the axis of the model with the supporting sting therefor under control of an operator at a distance and while the model is disposed within a wind tunnel.

Still another object is the provision of an accelerometer on the yieldable portion of the model support operatively connected to a recorder for making manifest the damping of the vibrations of the model while the tunnel is operating.

Still another of the objects resides in new and improved means for varying at will the point of oscillation of the model when supported by a sting.

Still other objects, advantages and improvements will be apparent from the following description taken in connection with the accompanying drawings of which:

Fig. 1 is an elevational view partially broken away of an aerodynamic model supported by the damping-in-pitch balance of the present invention according to a preferred embodiment thereof;

Fig. 2 is an enlarged view in elevation, partially in section and partially broken away of the device of Fig. 1;

Fig. 3 is a plan view in section of the balance of Fig. 2 with the model removed;

Fig. 4 is a diagrammatic view of the recording apparatus employed with the device of Fig. 1 and the control circuits therefor;

Fig. 5 is a circuit diagram of the motor control circuit for aligning the model with the axis of the sting;

Fig. 6 is an enlarged view of the accelerometer taken along the line 6—6 of Fig. 3;

Fig. 7 is a view of the means for yieldably aligning the model with the axis of the sting taken along the line 7—7 of Fig. 2;

Fig. 8 is a view in section of the air controlled means for setting the model into oscillation;

Fig. 9 is a view of one of the flexure members of Fig. 2;

Fig. 10 is a view of the other flexure member of Fig. 2; and

Figs. 11 and 12 are enlarged views taken along the lines 11 and 12 respectively of Fig. 1.

Referring now to the drawings for a more complete understanding of the invention on which like numerals of reference are employed to designate like or similar parts throughout the several views, and more particularly to Fig. 1 thereof there is shown thereon a damping-in-pitch balance according to a preferred form of the invention and designated generally by the numeral 10 and comprising a solid support 11 secured within the wind tunnel as by the member shown in dashed outline and indicated by the numeral 12. The support 11 is preferably circular in exterior configuration except for that portion 13 thereof which is reduced externally to an elliptical configuration with the major axis thereof horizontal thereby to provide a structure having a maximum degree of rigidity and an increased degree of pitch of the model about the point of oscillation thereof without the tail portion of the model striking the sting during such oscillation. The forward end of the sting is constructed and arranged to receive a member 14 secured thereto in a suitable manner and provided with a pair of flat surfaces 15 arranged mutually perpendicular and intersecting the axis of the sting.

Secured to the surfaces 15 as by the screws 16 are a pair of flexible plates or flexures 17 and 18, the other ends of the flexures being secured as by the screws illustrated to a block member 19 at the surfaces 20 thereof. The block member 19 is connected to a collet 21 having a plurality of flexible jaws 22 thereon externally configured to form a cylinder adapted for gripping engagement with the interior surface of the model to be tested, the jaws being expandable by the conical member 23 threaded upon the core 24. The member 23 is preferably provided with a plurality of radial slots 25 for engagement with a circular spanner wrench whereby the member 23 may be rotated sufficiently to cause the model to be fixedly engaged by the outer surfaces of the jaws 22. A pair of linear members 25 are employed to additionally secure the collet 21 to solid support 11 through which the slotted members are secured as by the screws 51 illustrated, Fig. 3.

An accelerometer indicated generally by the numeral 26 is secured to the sleeve 24 in coaxial relation therewith as by the screw 27.

The accelerometer comprises a cylindrical casing 28, Figs. 3 and 6, secured thereto in any suitable manner. The accelerometer comprises a hub element 29 having a support 31 formed thereon to which is secured as by the screws 32 and clamping members 33 a pair of flexible plates or flexures 34 and 35, Fig. 6. The other end of each of the flexures is clamped as by the screws 36 to a mass 37 and a pair of additional masses 38 in such manner that the masses move relative to the support 31 in a substantially vertical direction in response to the pitch movement of the model under test, the degree of such movement being proportional to the degree of pitch. The flexure of the plates 34 and 35 corresponding to the movement of the masses relative to support 31 is sensed by four strain gages arranged in pairs on opposite sides of the plate 34 and secured thereto as by cementing the parts together, the strain gages being designated by the numerals 39, 41, 42 and 43 respectively. An external electrical connection to the strain gages 39, 41, 42 and 43 is established by way of separable multi-contact plugs 44, 45, 46, Fig. 3, and conductors therebetween from whence the circuit is continued by way of conductors within tube 47 secured within slot 48 formed in the sting to multicontact plug 49, Fig. 1.

There is also secured to the collet 21 as by the screws 51 a pair of longitudinally extending arms 52 to which are secured as by the screws 53 to an arcuate member 54 adapted for close gripping engagement with the internal cylindrical surface of the model under test and having a longitudinally extending arm 55 preferably formed integrally therewith. Secured to member 54 at the lowermost interior portion thereof is a threaded washer like member 56 to which is secured as by the screw 57 one end of a coil spring 58. The other end of the spring is secured to the bottom of a circular well 59 formed within a slidable block 61 of external square configuration mounted for sliding movement within a complementary well 62 formed within an end portion of the sting substantially as shown. The block 61 is threaded to receive a screw 63 having a gear 64 carried thereby for rotating the screw as the gear is turned by a pinion 65 secured to shaft 66. Longitudinal movement of gear 64 is prevented by bracket 67 having a bearing surface within which a bearing 68 secured to gear 64 is disposed for rotary movement.

Shaft 66 is journalled within the bearing support 69 carried by the sting and disposed for rotary movement within groove 71, Figs. 11 and 12, extending longitudinally along the top portion of the sting. An arrangement is thus provided in which by selective rotation of the shaft 66 the block 61 may be moved slideably in a vertical direction to a selected setting such that the spring 58 has sufficient tension or compression, as the case may be, applied thereto to align the model with the axis of the sting prior to the operation of the wind tunnel and while the sting and model are disposed therein.

An actuating lever 72 is arranged within a slotted portion 73 of the sting and supported therein for reciprocal movement by the bearing screw 74. Pivotally connected to lever 72 as at 75 is a rod 76 slideably disposed within grove 77 arranged longitudinally along the lower portion of the sting. This lever arrangement and rod 76 are employed to move the lever 72 into contact with the inner surface of the arm 55 with sufficient force to tilt the nose of the model upwardly and out of alignment with the axis of the sting and thereafter to be suddenly disengaged from contact with the arm whereby the model is set into oscillation, as will more clearly appear as the description proceeds.

Secured to the rear portion of the sting in any suitable manner is a supporting frame structure indicated generally by the numeral 78 comprising a block 79 having an aperture therein for receiving tubular support 11, to which it is secured in a well known manner, a rear wall 81 a bottom plate 82, enclosed by a top plate and a pair of side plates, one of the side plates being removed in Fig. 1 to enable the mechanism within the supporting structure or casing 78 to be clearly illustrated. A reversible gear reduction motor 83 is secured to plate 81 as by the screws 84. The output shaft of the motor is connected to a threaded screw member 85, the opposite end of the screw member being coupled to rotary shaft 66. The motor may be of any type submittable for the purpose such, for example, as a 27-volt D.C. motor illustrated and manufactured by Globe Industries, Incorporated, Dayton, Ohio. Threaded on screw 85 is a block 86 adapted to be moved axially along the screw into contact with switch 87 or switch 88, as the case may be, to limit the degree of rotation of shaft 66 and zero adjusting screw 63 controlled thereby.

There is also secured to the wall 81 as by the bolts 89 and tubular spacing elements 91, a pneumatically controlled mechanism indicated generally by the numeral 92 for imparting sliding movement to rod 93 selectively in accordance with the admission of compressed air thereto through duct 94. The device comprises an arcuately shaped base plate 95 having a cylinder 96, Fig. 8, integral therewith or secured thereto in any suitable manner as by soldering or brazing the parts together. A piston 97 secured to the rod 93 as by threading the parts together is slidably disposed within cylinder 96, preferably a quantity of sealing lubricant such as light oil or the like being employed to maintain an effective air seal therebetween. The outer end of cylinder 96 is threaded to receive a plug 98, the central inner portion of which is recessed at 99 to receive a spring 101, the other end of the spring being disposed in recess 102 of piston 97. The spring is continuously under compressive strain of sufficient strength to move lever 72 from an extended position in engagement with the model to the retracted position shown on Fig. 2 when air pressure is suddenly removed from duct 94. The plug 98 has a vent 100 therein of sufficient size to permit quick movement of the piston 97 throughout the stroke thereof within cylinder 96.

Connected to plate 82 as by the bracket 103 is a three-way valve indicated generally by the numeral 104 having electromagnetic means for controlling the operation thereof selectively in accordance with electrical power applied to a pair of conductors within cable 105. The valve is connected to a source of compressed air (not shown) by way of nipple 106, the exhaust therefor being indicated at outlet 107. An arrangement is thus provided in which compressed air at the inlet is applied to duct 94 in one position of the valve and the inlet 106 is closed and duct 94 is in communication with outlet 107 when the valve is in the other position. Rod 93 is connected to rod 76 by coupling 108 illustrated.

The sting is also provided with a flat surface 109, Fig. 11, extending along a horizontal edge portion thereof opposite the groove 48 on which are inscribed a plurality of numerically designated marking or indicia, not shown, at 1 inch intervals, for example, of progressively increasing order of magnitude which may be employed as reference marking to indicate the distance thereof from the point of oscillation of the model, when the model has been mounted on the collet 21, by sighting across the end of the model and noting the position of the end of the model with respect to the indicia.

The electrical connections between the accelerometer and the pitch sensing strain gage elements with the control elements of a pair of pen recording devices respectively connected thereto is shown on Fig. 4. The flexible plate 17, Fig. 2, is provided with four strain gages 111, 112, 113 and 114 arranged in pairs on opposite sides thereof, each of the strain gages being cemented or otherwise secured to a central portion of the plate 17, the strain gages 111 and 112 being secured on opposite sides of the plate in back-to-back relation and strain gages 113 and 114 are secured to the plate in like manner. Battery potential is applied to the juncture of gages 111 and 114, Fig. 4, and to the juncture of gages 112 and 113 respectively. In like manner the strain gages 39, 41, 42 and 43 of the accelerometer are connected as shown on Fig. 4 to a battery. The strain gages of the damping-in-pitch sensing element and the accelerometer sensing element are thus connected as two Wheatstone bridges having the output or galvanometer circuits thereof operatively connected to the control magnets respectively of a pair of recording pens 115—116 of a pen recorder 117. There is also shown on Fig. 4 a moving chart 118 on which is inscribed by the pens 115 and 116 respectively a curve 119 corresponding to the damping-in-pitch of the model under test and a curve 121 on which is shown the acceleration or rate of decrease in the amplitude of pitch of the model.

A control circuit suitable for use with the zero setting mechanism for initially aligning the model with the axis of the sting is shown in diagrammatic form on Fig. 5. Referring now specifically to Fig. 5 the operating circuit for motor 83 extends from the motor to a pair of ganged movable contacts or blades 122 and 123 of a two pole double throw switch designated by numeral 124. The contacts of the switch are connected to switches 87 and 88 in a manner to control the operation of motor 83 in either direction selectively in accordance with the position of blades 122 and 123 of the switch from power received from a source of energy such, for example, as the battery 125 illustrated, the plug connections of multi-contact plug 49 being also illustrated on the figure.

The operation of the circuit of Fig. 5 will now be described. Let it be assumed, by way of example, that a model has been clamped to collet 21 such that the center of gravity thereof substantially coincides with intersection of plates 17—18, Fig. 2, the indicia on surface 109, Fig. 11 being employed for this purpose. Let it further be assumed that the model does not at this time assume a position in alignment with the axis of the sting but that the nose thereof is inclined somewhat downwardly. The operator at a remote control panel on which switch 124 is mounted observes this condition and throws switch arms 122—123 to the left as viewed in the drawing. When this occurs a circuit is closed from positive terminal of battery 125 by way of conductor 126, closed contact of switch 88, conductor 127, switch blade 122, conductor 128, through motor 83 from whence circuit is continued by way of conductor 129, blade 123 of switch 124 and conductor 131 to negative terminal of the battery. The motor 83 is thus set into operation in a direction to compress spring 58 and currently therewith move block 86 to the right. When spring 58 has been compressed sufficiently to move the model into alignment with the axis of the sting switch 124 is opened and the motor comes to rest with block 61 in a selected adjusted position in the well within which it moves.

In the event that the model had been clamped by collet 21 with the center of gravity thereof so far displaced from the intersection of plates 17—18 that correction could not be made by spring 58 in the assumed example, motor 83 would continue to operate until block 86 moved into engagement with switch 88 thereby interrupting the operating circuit of the motor and bringing the motor to rest. The switch 124 is now thrown to a position such that the blades 122, 123 thereof engage the contacts shown at the right on the drawing. When this occurs the motor is operated over the following circuit: conductor 126 from positive terminal of battery 125 to switch blade 123, conductors 129 to motor 83 from whence the circuit is continued by way of conductor 128, switch blade 122, conductor 132, switch 87, conductor 131 and thence to the negative terminal of battery 125. The motor thus operates in a reverse direction to cause the compressive strain in spring 58 to be reduced, the block 86 moving to the left concurrently therewith.

The model is now repositioned on collet 21 and if the nose portion of the model continues to incline downward the foregoing cycle operations are repeated, if on the other hand the nose of the model is inclined upwardly switch 124 is thrown to the right causing the spring 58 to be elongated and apply a yieldable restoring force to the model in a direction to tilt the nose of the model downwardly into alignment with the axis of the sting. If, in the last assumed example, the nose of the model still points upwardly when block 86 engages switch 87, operation of switch 87 brings the motor to rest and the switch is now thrown to the right to decrease the tension of spring 58 and concurrently therewith to move block 86 away from switch 87 and toward switch 88. The model is again adjusted on collet 21 and the foregoing procedure is repeated until the model is brought into alignment with the sting by a small force yieldably applied thereto by spring 58. A high degree of precision of alignment of the model with the sting is thus obtained.

The operation of the damping-in-pitch balance of the present invention to obtain a recording of the damping-in-pitch and the acceleration or rate of decay of the oscillations accompanying such damping will now be described. Let it be assumed, by way of example, that the model has been mounted on collet 21 and brought into alignment with the axis of the sting by the selective operation of motor 83. Electrical energy is supplied to the conductors in cable 105 by closure of a switch (not shown) located at a distance from the wind tunnel thereby operating valve 104 to admit pressure by way of conduit 94 into the cylinder of mechanism 92 causing piston 97 to be moved to an operating position against the pressure of spring 101 and currently therewith move lever 72 downwardly into forcible engagement with arm 55 thereby forcibly tilting the nose of the model upwardly such that the model is no longer in alignment with the axis of the sting and the plates 17 and 18 are flexed.

The wind tunnel is now set into operation and shortly thereafter the switch controlling the electric power to three-way valve 104 is opened thereby deenergizing the electromagnetic element within valve 104 and causing the piston 97 to be cut-off from the supply of compressed air and communication to be established between conduit 94 and the exhaust outlet 107. When this occurs piston 97 is moved to the left as viewed in the drawing by spring 101 causing lever 72 to be moved quickly to the initial retracted position thereof shown on Fig. 2 thereby setting the model into free oscillation about a horizontal axis coincident with the intersection of plates 17 and 18. This condition is shown in Fig. 4 at 139 and 141 on curves 119 and 121 respectively. The oscillations of the model are attenuated as shown on curve 119 and the angular deflection of the model during such oscillations and the angular acceleration thereof is made manifest by curve 121. Since the vibration is free (i.e. not forced) the aerodynamic damping forces on the model cause the amplitude of oscillation to decay and from the trace on the chart thus obtained the logarithmic decrements of the motion of the model may be measured and from this data the aerodynamic damping coefficient may be computed. Curve 121, it will be noted, is 180° out of phase with curve 119 and each of the curves follows an exponential law. The rate of oscillation is determined by the thickness and stiffness of plates 17 and 18. A predetermined rate of oscillation, may be obtained by selection of plates 17 and 18 of the required thickness and stiffness.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A damping-in-pitch balance for a wind tunnel model comprising a sting having an elliptical cross section, a pair of flexure members secured to one end of said sting, said members being disposed in a pair of planes that intersect at a right angle, a collet secured to said members for supporting a wind tunnel model, an accelerometer carried by the forward end of said collet for sensing angular acceleration of the model, mechanism carried by said sting for applying a moment to the model just sufficient to maintain the model axis coincident with the axis of the sting at various angles of attack, an air cylinder secured to said balance, tripping means carried by said sting and operated by said air cylinder for initiating model oscillation, and means including a plurality of strain gages secured to said flexure members for providing a continuous electrical signal proportional to the angular displacement of the model.

2. A balance according to claim 1 including means connected electrically to said strain gages and to said accelerometer for recording said signal and simultaneously therewith the force of acceleration sensed by the accelerometer.

3. An aerodynamic damping balance for testing the damping-in-pitch and acceleration of a model within a hypersonic wind tunnel comprising a sting secured to the interior of said wind tunnel, an expandable collet for establishing a rigid connection between the outer surface thereof and the interior of a body to be tested, an accelerometer device secured to the forward end of said collet, an inertia element within said accelerometer device, resilient means for yieldably supporting said inertia element in an initial position in such manner that the yieldable means is flexed in response to vertical movement of the accelerometer device, a plurality of strain gage devices secured to said resilient element and interconnected to form a Wheatstone bridge, means including a pair of plates secured in mutually intersecting relation to said collet and to the end portion of said sting in such manner as to support said collet in a horizontal position for vibratory movement in a vertical plane about the line of intersection of said plates, a plurality of strain gage elements secured on opposite sides of one of said plates and interconnected to form a second Wheatstone bridge, a two pen recorder, means including a plurality of electrical connections for operatively connecting said pens to the Wheatstone bridges respectively, means for electrically energizing said Wheatstone bridges, and means for setting said model into free oscillation in said vertical plane while the wind tunnel is operating.

4. The balance of claim 3 including means controlled from a distance for yieldably aligning the model with the axis of said sting prior to operation of the wind tunnel.

5. The balance of claim 3 in which the model aligning means includes a motor driven screw element having a resilient spring operatively connected thereto and to said model for applying a biasing force yieldably thereto.

6. The balance of claim 5 including means for selectively operating the motor in either direction.

7. The balance of claim 6 including means for interrupting the operation of the motor at predetermined limits of adjustment of said screw element.

8. A balance for an aerodynamic model to be tested in a wind tunnel comprising a sting rigidly supported within said tunnel, means for mounting said model on the forward end portion of said sting for vibratory movement with respect thereto, means controlled at a distance for momentarily setting the model into free vibration while the wind tunnel is in operation, means carried by said sting and disposed wholly within said model for sensing the damping-in-amplitude of said vibrations and concurrently therewith the acceleration rate thereof, and means operatively connected to said balance for recording the exponential decrease in amplitude and acceleration of said vibrations.

9. A balance according to claim 8 in which the means for setting the model into vibration is electro-pneumatically controlled.

10. A balance according to claim 8 in which the cross sectional area of said sting is elliptical in configuration with the major axis of the ellipse parallel to a line defining the center of oscillation of the model whereby the amplitude of oscillation of the model may be increased without the rear end portion thereof striking the sting as the model vibrates.

References Cited in the file of this patent

UNITED STATES PATENTS

| | | |
|---|---|---|
| 2,359,245 | Ritzmann | Sept. 26, 1944 |
| 2,487,793 | Esval et al. | Nov. 15, 1949 |
| 2,700,305 | Kendall | Jan. 25, 1955 |

OTHER REFERENCES

Publication, NAVA TN 3,347, Jan. 1955, pages 16, 17, 18, 29, 30 and 31.